(12) United States Patent
Sasaki (10) Patent No.: US 11,073,674 B2
(45) Date of Patent: Jul. 27, 2021

(54) LENS APPARATUS AND IMAGING APPARATUS

(71) Applicant: CANON KABUSHIKI KAISHA, Tokyo (JP)

(72) Inventor: Kunihiko Sasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 254 days.

(21) Appl. No.: 16/200,809

(22) Filed: Nov. 27, 2018

(65) Prior Publication Data

US 2019/0162926 A1 May 30, 2019

(30) Foreign Application Priority Data

Nov. 28, 2017 (JP) .............................. JP2017-227710

(51) Int. Cl.
*G02B 7/02* (2021.01)

(52) U.S. Cl.
CPC ...................................... *G02B 7/02* (2013.01)

(58) Field of Classification Search
CPC ....... B61L 3/006; B63B 25/28; G01C 21/203; G06Q 10/08; G06Q 10/0831; G06Q 10/0833; G01R 31/367; G01R 31/371; H01M 10/4285; H01M 10/48; H01M 2220/30; H01R 13/453; H01R 13/629; H02J 7/0021; H02J 7/0042; G02B 7/02; G02B 7/10; G03B 17/12; G03B 2205/0046

See application file for complete search history.

(56) References Cited

U.S. PATENT DOCUMENTS

| | | | | |
|---|---|---|---|---|
| 4,974,949 A | * | 12/1990 | Tanaka | G02B 7/102 359/704 |
| 7,952,814 B2 | | 5/2011 | Koyama et al. | |
| 2002/0135901 A1 | * | 9/2002 | Nomura | G02B 7/10 359/819 |

FOREIGN PATENT DOCUMENTS

| | | |
|---|---|---|
| JP | H11311733 A | 11/1999 |
| JP | 2015106128 A | 6/2015 |
| JP | 5962432 B2 | 8/2016 |

* cited by examiner

*Primary Examiner* — Joseph P Martinez
*Assistant Examiner* — Vipin Patel
(74) *Attorney, Agent, or Firm* — Rossi, Kimms & McDowell LLP (57) ABSTRACT

A lens apparatus includes a plurality of lens holders, a first cam barrel, a second cam barrel, and a third cam barrel each having a cam groove configured to move at least one of the plurality of lens holders in an optical axis direction. The first cam barrel is located outside the second cam barrel and the third cam barrel, and the second cam barrel is located outside the third cam barrel. A predetermined condition is satisfied.

10 Claims, 7 Drawing Sheets

LENS APPARATUS AND IMAGING APPARATUS

BACKGROUND OF THE INVENTION

Field of the Invention

The present invention relates to a lens apparatus and an imaging apparatus.

Description of the Related Art

Japanese Patent Laid-Open No. 2015-106128 discloses a compact lens barrel having a wide focal length. Japanese Patent No. 5962432 discloses a lens barrel that includes a drive barrel, changes rotation angles of a zoom operation ring and a cam barrel relative to a guide barrel, and increases the rotation angle of the zoom operation ring while reducing the rotation angle of the cam barrel. This configuration can arrange a plurality of cam grooves on a cam barrel while improving the rotation detection accuracy of the zoom operation ring.

However, the lens barrel disclosed in Japanese Patent Laid-Open No. 2015-106128 needs a cam barrel having a plurality of cam grooves, and has difficulties in increasing the rotation angle of the cam barrel. It is therefore difficult to increase the rotation angle of the zoom operation ring. The lens barrel disclosed in Japanese Patent No. 5962432 has difficulties in providing a plurality of cams, for example, in operating a plurality of (five or more) units (or a plurality of lens holders).

SUMMARY OF THE INVENTION

The present invention provides a lens apparatus that includes a plurality of lens holders with a wide rotation angle of the operation ring and an imaging apparatus having the same.

A lens apparatus according to the present invention includes a plurality of lens holders, a first cam barrel, a second cam barrel, and a third cam barrel each having a cam groove configured to move at least one of the plurality of lens holders in an optical axis direction. The first cam barrel is located outside the second cam barrel and the third cam barrel, and the second cam barrel is located outside the third cam barrel. When the first cam barrel is rotated by a first rotation angle $\theta 1$ around an optical axis, the second cam barrel rotates by a second rotation angle $\theta 2$, the third cam barrel rotates by a third rotation angle $\theta 3$, and the following expression is satisfied: $\theta 1 > \theta 2 > \theta 3$.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

Figure 1:
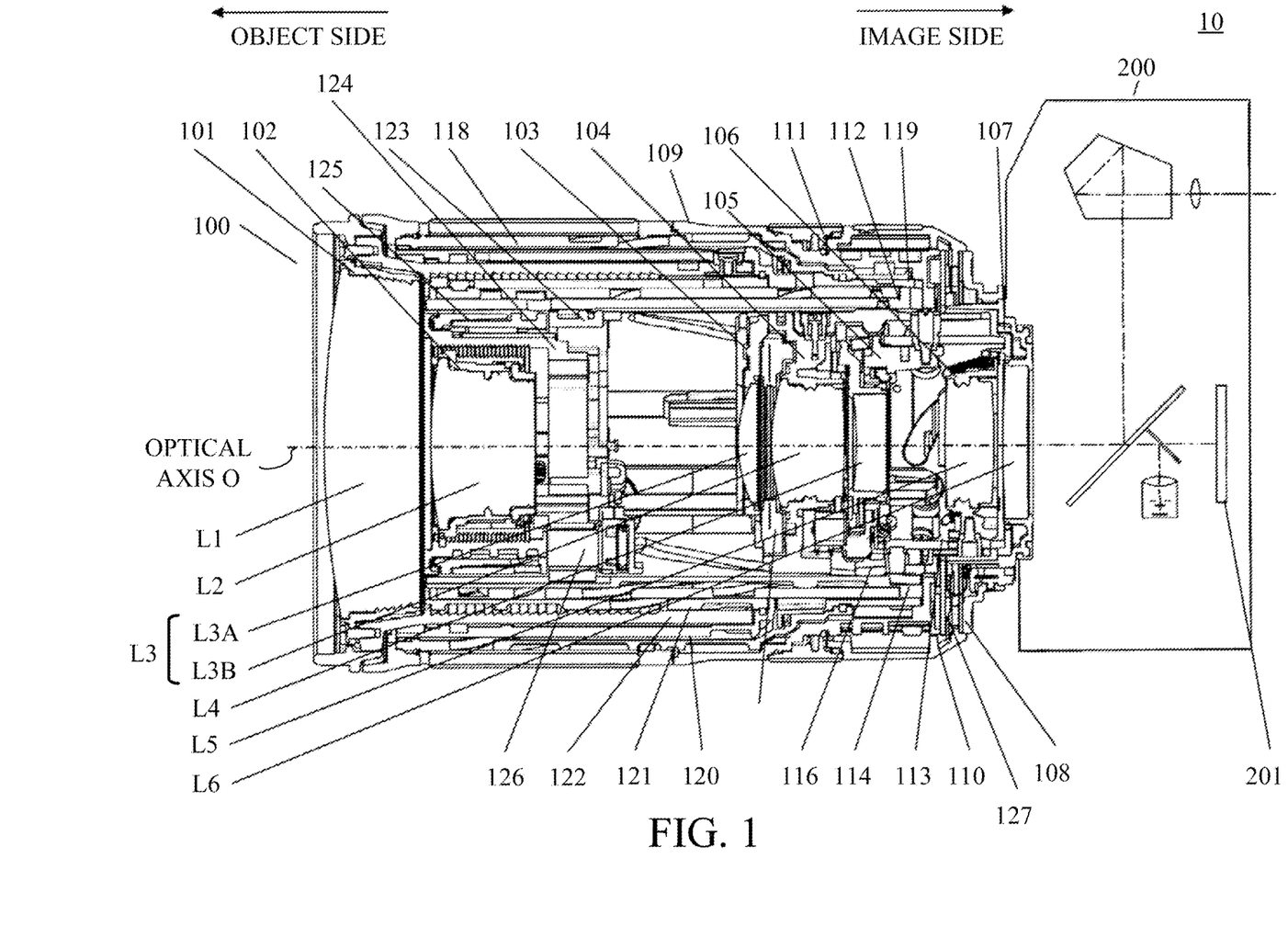
FIG. 1 is a sectional view at a wide-angle end of an imaging apparatus according to this embodiment.
Figure 2:
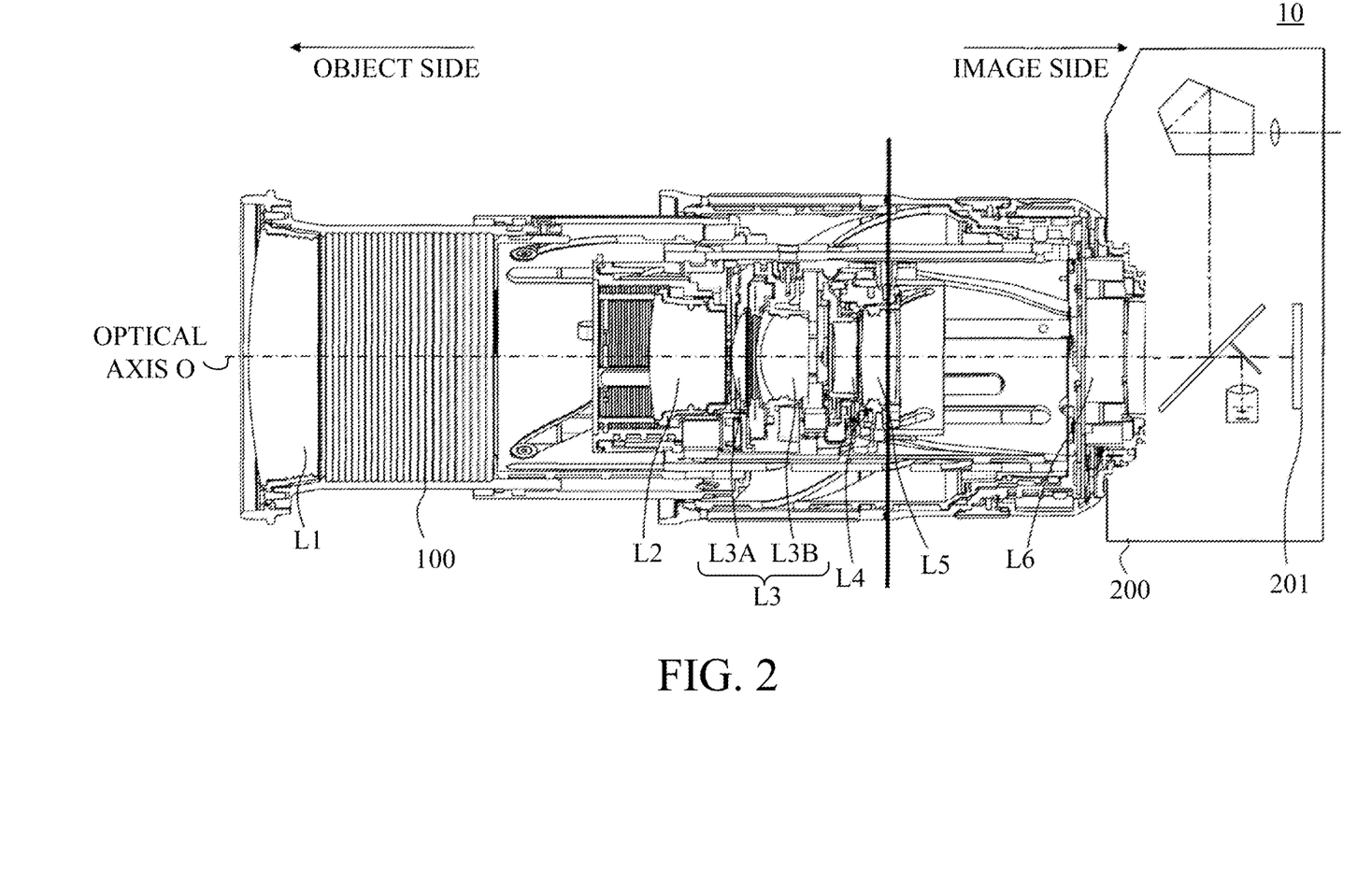
FIG. 2 is a sectional view at a telephoto end of the imaging apparatus according to this embodiment.
Figure 3:
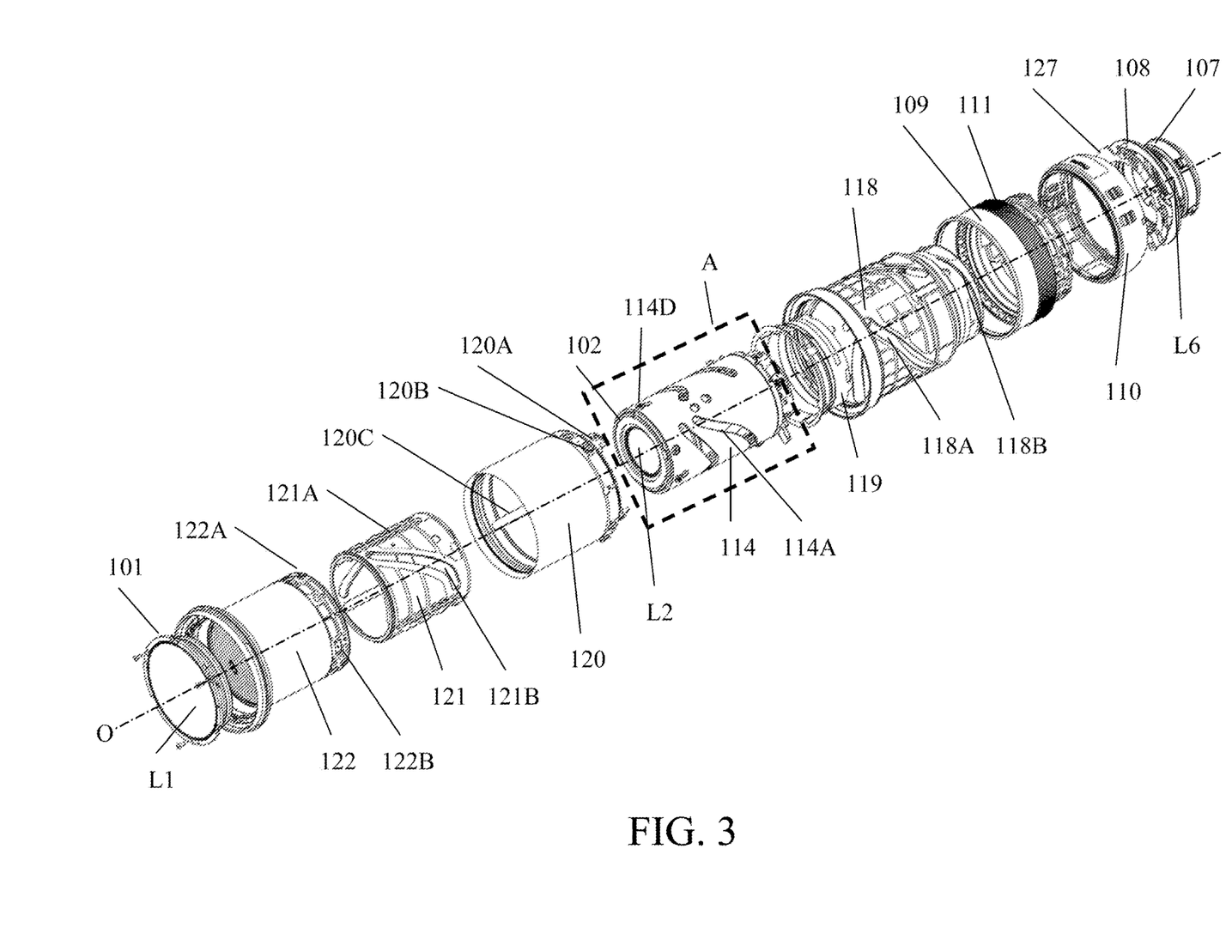
FIG. 3 is an exploded perspective view of a lens apparatus according to this embodiment.
Figure 4:
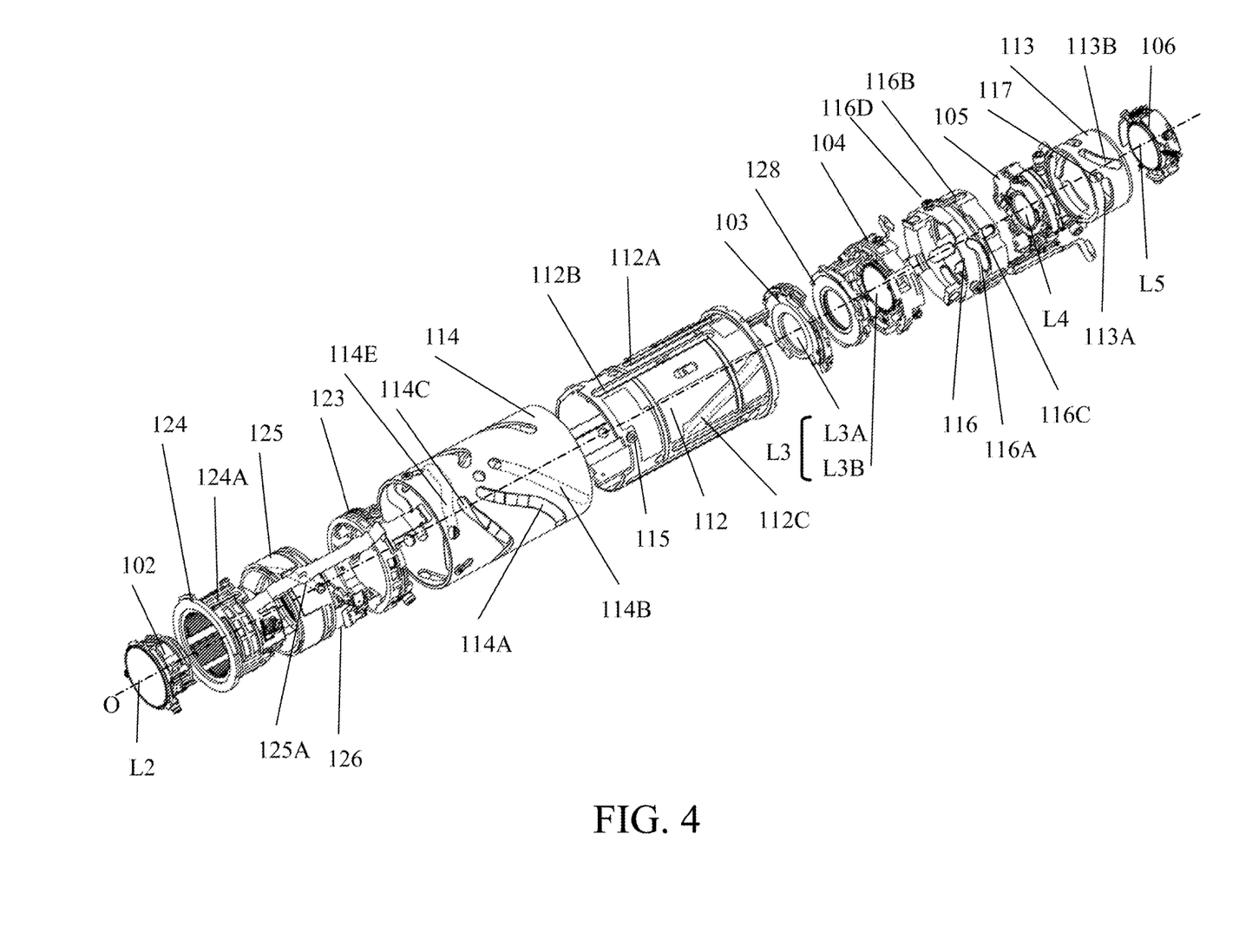
FIG. 4 is an exploded perspective view of an area A in FIG. 3.

Referring now to FIGS. 1 to 4, a description will be given of a lens apparatus and an imaging apparatus according to this embodiment. FIGS. 1 and 2 are sectional views of an imaging apparatus 10 taken along a plane parallel to an optical axis O. FIG. 1 illustrates the interchangeable lens (lens apparatus) 100 located at the wide-angle end, and FIG. 2 illustrates the interchangeable lens 100 located at the telephoto end. FIG. 3 is an exploded perspective view of the interchangeable lens 100. FIG. 4 is an exploded perspective view of an area A enclosed by a broken line in FIG. 3. However, for better understandings, FIGS. 3 and 4 omit members unnecessary for the description of this embodiment.

The imaging apparatus 10 is a single-lens reflex camera system that includes a camera body 200 and an interchangeable lens 100 attachable to and detachable from the camera body 200. However, this embodiment is not limited to this example, and is applicable to an imaging apparatus, such as a digital camera and a video camera, in which the camera body and the lens apparatus are integrated with each other. In this embodiment, the interchangeable lens 100 performs an autofocus (AF) operation and a zooming operation by a manual operation by a user, but the present invention is not limited to this embodiment.

In a direction along the optical axis O (optical axis direction), the interchangeable lens 100 includes six lens units or, in order from the object side to the image side, a first lens unit L1, a second lens unit L2, a third lens unit L3, a fourth lens unit L4, a fifth lens unit L5, and a sixth lens unit L6. The first lens unit L1 is held by a first lens holder (or holding frame) 101 and configured movable in the zoom operation. The second lens unit L2 is a focus lens unit held by a second lens holder (focus lens holder) 102 and configured movable in the zooming operation and the focusing operation. The third lens unit L3 includes a 3A-th lens subunit L3A and a 3B-th lens subunit L3B, held by a 3A-th lens holder 103 and a 3B-th lens holder 104, respectively, and configured movable in the zooming operation. The fourth lens unit L4 is an image stabilization lens unit (correction lens unit) that moves parallel to the direction orthogonal to the optical axis O (optical axis orthogonal direction) and corrects an image blur, and is held by the image stabilization unit 105 and configured movable in the zoom operation. The fifth lens unit L5 is held by a fifth lens holder 106 and moved by the zoom operation. The sixth lens unit L6 is a fixed lens unit held by the sixth lens holder 107 and does not move in the zooming operation or the focusing operation. The interchangeable lens 100 according to this embodiment is a so-called two-unit inner focus lens in which the second lens unit L2 is a focus lens unit, and is an optical six-unit zoom lens.

A detailed description will now be given of each component and configuration in the interchangeable lens 100. A lens mount 108 serves to connect the camera body 200 and the interchangeable lens 100 to each other. The camera body 200 and the interchangeable lens 100 electrically communicate with each other via the lens mount 108. The camera body 200 includes an image sensor 201. The image sensor 201 is a photoelectric conversion element including a CCD sensor, a CMOS sensor, and the like, and converts an object image (optical image) formed via the interchangeable lens 100 into an electric signal (performs a photoelectric conversion of the object image). The lens mount 108 is fixed onto a fixed barrel 109 with an unillustrated screw via an exterior ring 110. The lens mount 108 holds the sixth lens holder 107. The sixth lens holder 107 has an elastically deformer made of a resin material and is fixed by engaging the elastically deformer with the lens mount 108. In this embodiment, the sixth lens holder 107 is fixed onto the lens mount 108 by the elastic deformation, but it may be fixed by other fixing means such as the screw connection or adhesive. Hereinafter, the various fixing means in this embodiment is not limited to a single fixing means, and can be changed if necessary.

The fixed barrel 109 is screwed onto the lens mount 108. The fixed barrel 109 includes a rotation detecting gyro element as an unillustrated vibration detector, a photointerrupter, a rotation detector of a focus operation ring 111 including an MR element, a GMR element and the like, and a zoom detector that detects the zoom position. The exterior ring 110 is held and fixed between the lens mount 108 and the fixed barrel 109. The exterior ring 110 includes a variety of unillustrated operation switches.

A guide barrel (fixed frame) 112 is located inside (the optical axis O side) of the zoom operation ring 118, which will be described later, and is fixed onto the fixed barrel 109 with an unillustrated screw. The guide barrel 112 has a first linear movement guide groove 112A and a second linear movement guide groove 112B for guiding the first lens unit L1, the second lens unit L2, and the third lens unit L3 in the optical axis direction in the zoom operation. The guide barrel 112 has a cam groove 112C for rotating a sub cam (third cam barrel) 113, which will be described later, around the optical axis O. A cam follower 115 is screwed onto the guide barrel 112 and used to rotationally advance (or protrude) the cam barrel (second cam barrel) 114 on the outer circumference of the guide barrel 112 in the optical axis direction in the zooming operation. In this embodiment, unless otherwise specified, each cam groove, each linear movement groove, and each cam follower are arranged at three positions, for example, at 120° intervals around the optical axis O. This embodiment made the cam grooves or linear movement grooves arranged at these three positions of the same (type of) cam grooves or linear movement grooves. Thus, a plurality of cam grooves (or a plurality of linear movement grooves) mean a plurality of types of cam grooves (or linear movement grooves) having different trajectories or objects to be driven.

The cam barrel 114 has three types of (totally nine) cam grooves corresponding to the trajectories of the cam barrel moving cam groove 114E and the first lens unit L1 to the third lens unit L3 in the zoom operation. The cam barrel 114 is rotationally advanced in accordance with the zoom operation by the interaction between the cam barrel moving cam groove 114E and the cam follower 115. The three types of cam grooves contain a rotation transmitting cam groove 114A, a third unit driving cam groove 114B, and a second unit driving cam groove 114C. The rotation transmitting cam groove 114A is a cam groove for converting the linear movement of the first linear movement barrel 120 in the optical axis direction into the rotational movement. The third unit driving cam groove 114B is a cam groove for driving a third unit base barrel 116. The second unit driving cam groove 114C is a cam groove for driving the second unit adjusting frame (or adjuster) 123.

The third unit base barrel (second linear movement barrel) 116 is held by the first linear movement guide groove 112A of the guide barrel 112, the third unit drive cam groove 114B of the cam barrel 114, and a cam follower 116D, and linearly moved in the zoom operation. The third unit base barrel 116 holds the sub cam barrel 113 in a direction orthogonal to the optical axis through the diameter fitting (or engagement), and determines the optical axis direction via a cam follower 117 for rotating the sub cam provided to the sub cam barrel 113 and the engaged sub cam moving cam groove 116A of the third unit base barrel 116. The third unit base barrel 116 has a third linear movement guide groove 116B and a fourth linear movement guide groove 116C. The third linear movement guide groove 116B and the fourth linear movement guide groove 116C serve to linearly guide the image stabilization unit 105 and the fifth lens holder 106 via the cam follower along the optical axis O in the zoom operation.

The sub cam barrel (third cam barrel) 113 has a first sub cam groove 113A and a second sub cam groove 113B. Each of the first sub cam grooves 113A and the second sub cam grooves 113B interacts with each linear movement guide groove, and linearly moves the image stabilization unit 105 and the fifth lens holder 106 along the optical axis O in the zooming operation via the cam follower. In addition, the cam follower 117 and the cam groove 112C can rotate around the optical axis in the zooming operation.

A zoom operation ring (first cam barrel) 118 as an operation member is held rotatably around the optical axis on a zoom connection ring 119. The zoom operation ring 118 has a zoom cam groove 118A and a zoom detection cam groove 118B. The zoom cam groove 118A is a cam groove for linearly moving the first linear movement barrel 120 in the optical axis direction in the zoom operation. The zoom detection cam groove 118B is a cam groove for driving a resistance type linear sensor as a zoom position detector fixed onto the fixed barrel 109. The zoom connection ring 119 is screwed onto the guide barrel 112 and held rotatably around the optical axis while the position in the optical axis direction is fixed by the circumferential groove of the zoom operation ring 118 and an engagement claw of the zoom connection ring 119.

The first linear movement barrel 120 includes a cam follower 120A engaged with the second linear movement guide groove 112B and the cam groove of the cam barrel 114 and a cam follower 120B engaged with the zoom cam groove 118A. As the user rotates the zoom operation ring 118, the first linear movement barrel 120 is linearly moved by the interactions among the second linear movement guide groove 112B, the zoom cam groove 118A, and the cam follower 120B. The linear movement of the first linear movement barrel 120 is converted into the rotation of the cam barrel 114 by the cam follower 120A.

As described above, the rotational movement of the zoom operation ring (the first cam barrel) 118 is converted into the linear movement of the first linear movement barrel 120, and the linear movement of the first linear movement barrel 120 is converted into the rotational movement of the cam barrel (the second cam barrel) 114. The rotational movement of the cam barrel 114 is converted into a linear movement of the third unit base barrel (the second linear movement barrel) 116, and the linear movement of the third unit base barrel 116 is converted by the cam follower 117 and the cam groove 112C into the rotational movement of the sub cam barrel (third cam barrel) 113.

A detailed description will now be given of the mechanism about the operation of the first lens unit L1. The first lens unit L1 is a so-called two-stage advancing mechanism. The first stage of the first lens unit L1 is advanced by the above first linear movement barrel 120. The first linear movement barrel 120 holds the first unit cam barrel 121 so that the position of the first unit cam barrel 121 in the optical axis direction is the same as that of the first linear movement barrel 120 and the first unit cam barrel 121 is rotatable around the optical axis. The first linear cam barrel 121 has a fifth linear movement guide groove 121A for receiving the rotation from the cam barrel 114 and rotating similar to the cam barrel 114. The cam barrel 114 has a rotation transmitting cam follower 114D corresponding to the fifth linear movement guide groove 121A. The first unit cam barrel 121 has a cam groove 121B for advancing the second linear movement barrel 122 as the second stage of the advance unit of the first lens unit L1.

A cam follower 122A engaged with the sixth linear movement guide groove 120C of the first linear movement barrel 120 and a cam follower 122B engaged with the cam groove 121B are fixed onto the second linear movement barrel 122. The first lens holder 101 is screwed onto the second linear movement barrel 122 via an unillustrated washer, and the thickness of the used washer can adjust or select an angle of the first lens holder 101 relative to the optical axis O and the position in the optical axis direction.

Thus, the first linear movement barrel 120 is advanced by the rotational force of the zoom operation ring 118, and the rotation of the cam barrel 114 is transmitted to the first unit cam barrel 121 that rotates at a fixed position relative to the first linear movement barrel 120. Thereby, the second linear movement barrel 122 can be further advanced relative to the first linear movement barrel 120. As a result, the first lens unit L1, the third lens unit L3, the fourth lens unit L4, and the fifth lens unit L5 can be moved (driven) in the optical axis direction by the zoom operation.

A detailed description will now be given of the mechanism about the operation of the second lens unit L2. A second unit adjustment frame 123 as a zoom drive frame is held via the cam follower by the second linear movement guide groove 112B and a second unit drive cam groove 114C of the cam barrel 114, and linearly moved in the zoom operation. A second unit base frame 124 is held by a roller member (decentering roller) having cylindrical portions eccentric to each other on the second unit adjustment frame 123, and their positions are adjusted for improving the optical performance. The second unit base frame 124 has a seventh linear movement guide groove 124A. The second unit base frame 124 holds the second lens holder 102 via a cam follower due to a focus cam groove 125A in the second unit cam barrel 125 held rotatably (at a fixed position) around the optical axis similar to the second unit base frame 124 in the optical axis direction. The gear unit 126 includes a combination of an actuator and a gear train, and is fixed onto the second unit base frame 124 so that the second unit cam barrel 125 can be rotated by the output of the actuator.

The second lens holder 102 has a moving amount limiter relative to the second unit base frame 124 in the optical axis direction. This embodiment limits the moving amount when an impact is applied to the interchangeable lens 100 by bringing it into contact with the cam follower and the seventh linear movement guide groove 124A, and constitutes a mechanical moving end (mechanical end). The mechanical end is located slightly outside the movable range normally driven electrically by the gear unit 126. The second lens holder 102 has a light shield blade portion for shielding the output of the photo-interrupter fixed onto the second unit base frame 124, and constitutes a reset mechanism for forming a reference coordinate in focus driving.

This configuration enables, as described above, the rotation of the zoom operation ring 118 to rotationally advance the cam barrel 114 in the optical axis direction, and the second unit adjustment frame 123 to move back and forth in the optical axis direction. When the gear unit 126 rotates the second unit cam barrel 125 in the zoom operation and the focus drive, the second lens unit L2 as the focus lens unit can be driven according to the object position.

A main circuit board (or substrate) 127 controls the entire interchangeable lens 100, such as the focus drive control and control of an electromagnetically driven diaphragm unit 128 and the image stabilization unit 105, and is screwed onto the fixed barrel 109.

A detailed description will be given of the respective rotations of the zoom operation ring (first cam barrel) 118, the cam barrel (second cam barrel) 114, and the sub cam barrel (third cam barrel) 113 and the interlock mechanism among them. In zooming, the zoom operation ring 118 rotates by 100° (first rotation angle θ1) from the wide-angle end to the telephoto end, and restricts the rotation end through engagements parts of the zoom operation ring 118 and the fixed barrel 109. Three zoom cam grooves 118A formed in the zoom operation ring 118 have a complementary angle of 100° on both sides of the wide-angle end and the telephoto end. This embodiment uses one type of cam grooves for moving the lens unit in the zoom operation ring 118 (although a cam groove for the detection sensor exists separately at a position shifted in the optical axis direction). Since an angle occupied by the cam grooves among 360° is about 300°, one type of (three) linear movement grooves may be added and used as a linear movement guide groove for the first linear barrel 120.

Figure 7:
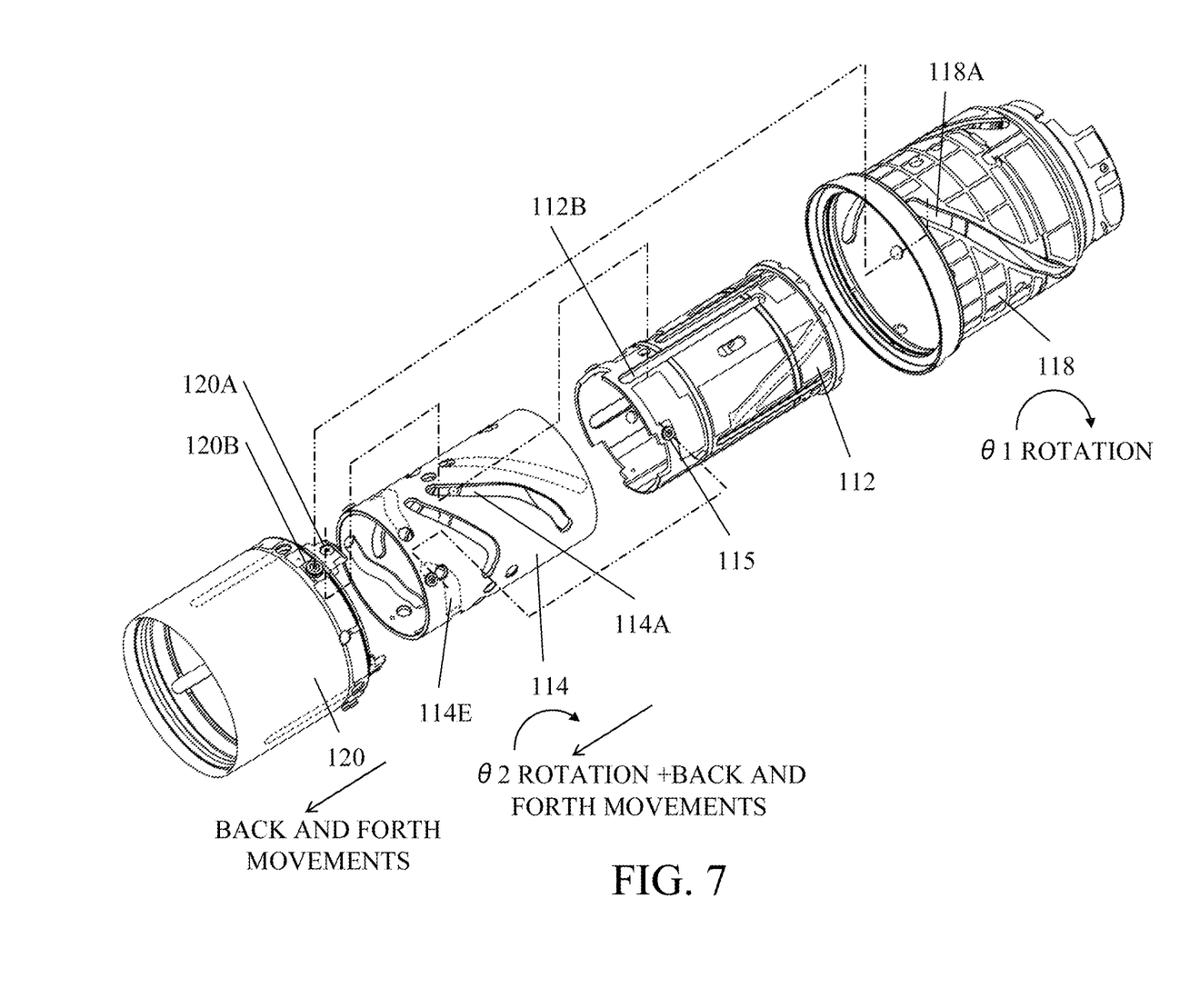
FIG. 7 is an exploded perspective view of a first rotation angle conversion mechanism according to this embodiment.

Referring now to FIG. 7, a description will be given of the first rotation angle conversion mechanism (first rotation angle converter). FIG. 7 is an exploded perspective view of the first rotation angle conversion mechanism. An alternate long and two short dashes line in FIG. 7 indicates a connection to each groove from each cam follower. The first rotation angle conversion mechanism is a mechanism for rotating the cam barrel 114 by a second rotation angle θ2 (θ1>θ2) as the zoom operation ring 118 rotates by the first rotation angle θ1.

In this embodiment, the first rotation angle conversion mechanism includes the zoom operation ring 118, the first linear movement barrel 120, the guide barrel 112, the cam follower 115, and the cam barrel 114. The zoom operation ring 118 has a fixed position in the optical axis direction, rotates around the optical axis, and includes the zoom cam groove 118A. The cam follower 120B in the first linear movement barrel 120 is engaged with the zoom cam groove 118A. The guide barrel 112 has a second linear movement guide groove 112B. The cam follower 120A in the first linear barrel 120 is engaged with the rotation transmission cam groove 114A of the cam barrel 114 and the second linear movement guide groove 112B. The cam follower 115 is fixed onto the guide barrel 112 and engaged with the cam barrel moving cam groove 114E in the cam barrel 114.

A detailed description will now be given of the operation of the first rotation angle conversion mechanism in the movement from the wide-angle side to the telephoto side. When the zoom operation ring 118 viewed from the camera body 200 side rotates counterclockwise, the cam follower 120B receives a force perpendicular to the groove surface by the surface on the camera body 200 side of the zoom cam groove 118A. Since the cam follower 120A is engaged with the second linear movement guide groove 112B, the first linear movement barrel 120 onto which the cam follower 120A is fixed is free to move only in the optical axis direction. Now assume that α1 is an angle between the contact portion of the zoom cam groove 118A with the cam follower 120B and the direction orthogonal to the optical axis. Then, according to the minute rotational angle Δθ1 of the zoom operation ring 118, the first linear movement barrel 120 moves in the optical axis direction by the "circumference length×tan(angle)"="angle×radius×tan(angle)" or as follows:

$$\Delta\theta 1 \times r1 \times \tan \alpha 1 \quad (1)$$

In the term (1), r1 is a distance between the zoom cam groove 118A and the optical axis.

Figure 5:
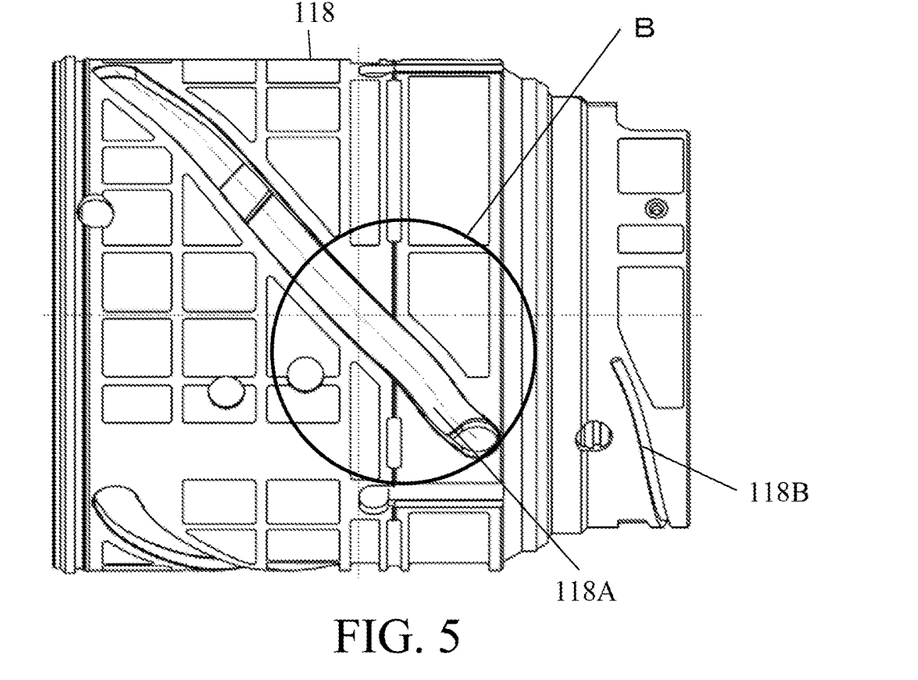
FIG. 5 is an overview of a zoom operation ring according to this embodiment.
Figure 6:
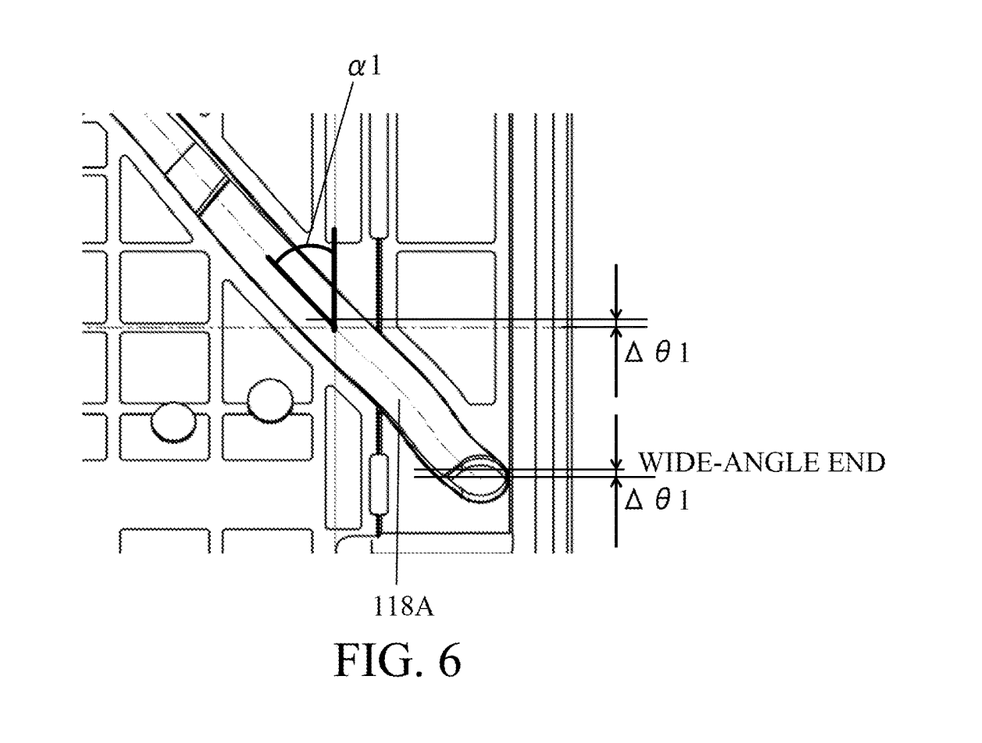
FIG. 6 is an enlarged view of an area B in FIG. 5.

FIG. 5 illustrates the zoom operation ring (zoom ring) 118 viewed from the outside (outer diameter side). FIG. 6 is an enlarged view of an area B in FIG. 5. Although Δθ1 is a minute rotational angle from the wide-angle end as described above, as illustrated in FIG. 6, Δθ1 is a minute rotation amount at an arbitrary cam groove position. As illustrated in FIG. 6, α1 represents an angle between a cam groove at a certain cam groove position and a line orthogonal to the optical axis. For the calculation convenience, assume a coordinate system having a first quadrant in which the clockwise axis viewed from the image side and the optical axis O. (For example, α1(°) in FIG. 6 satisfies 0<α1<90). Herein, α1 is referred to as a cam intersection angle of the zoom cam groove 118A, and this applies to each cam groove.

Since the movement of the first linear movement barrel 120 parallel to the optical axis O presses the cam follower 120A against the rotation transmitting cam groove 114A and generates a force perpendicular to the slope, the cam barrel 114 rotates by a minute rotational angle Δθ2 around the optical axis. Herein, the relationship between the position in the optical axis direction and the rotation angle for each of the guide barrel 112 and the cam barrel 114 is determined by the engagement between the cam follower 115 and the cam barrel moving cam groove 114E. Assume that α2 is an angle between the cam barrel moving cam groove 114E and the direction orthogonal to the optical axis. Then, the cam barrel 114 rotates by the minute rotational angle Δθ2, and moves by the amount expressed by the following term (2) in the optical axis direction:

$$\Delta\theta 2 \times r2 \times \tan(-\alpha 2) \quad (2)$$

In the term (2), r2 is a distance between the optical axis and the cam barrel moving cam groove 114E.

The moving amount of the first linear movement barrel 120 from the cam barrel 114 is expressed by the following term (3) or the term (1)—the term (2):

$$\Delta\theta 1 \times r1 \times \tan \alpha 1 - \Delta\theta 2 \times r2 \times \tan(-\alpha 2) \quad (3)$$

A moving amount of the cam follower 120A relative to the rotation transmitting cam groove 114A in the term (3) can be expressed as follows, where α3 is an angle between the rotation transmitting cam groove 114A and the optical axis orthogonal direction, and r3 is a distance between the optical axis and the rotation transmitting cam groove 114A:

$$\Delta\theta 2 \times r3 \times \tan \alpha 3 \quad (4)$$

Since the expression (3) is equivalent with the expression (4) and r2=r3 in this embodiment, the following expression (5) is established:

$$\Delta\theta 2 = \Delta\theta 1 \times (r1/r2) \times (\tan \alpha 1/(\tan(-\alpha 2) + \tan \alpha 3)) \quad (5)$$

The first rotation angle conversion mechanism converts the rotation angle as represented by the expression (5). In this embodiment, the cam barrel 114 has four types of cam grooves or a rotation transmitting cam groove 114A, a third unit driving cam groove 114B, a second unit driving cam groove 114C, and a cam barrel moving cam groove 114E. The rotation angle (second rotation angle θ2) of the cam barrel 114 from the wide-angle end to the telephoto end is 80°, which is set smaller than the rotation angle (the first rotation angle θ1) of the zoom operation ring 118. Therefore, the cam barrel 114 can have a plurality of cam grooves.

Figure 8:
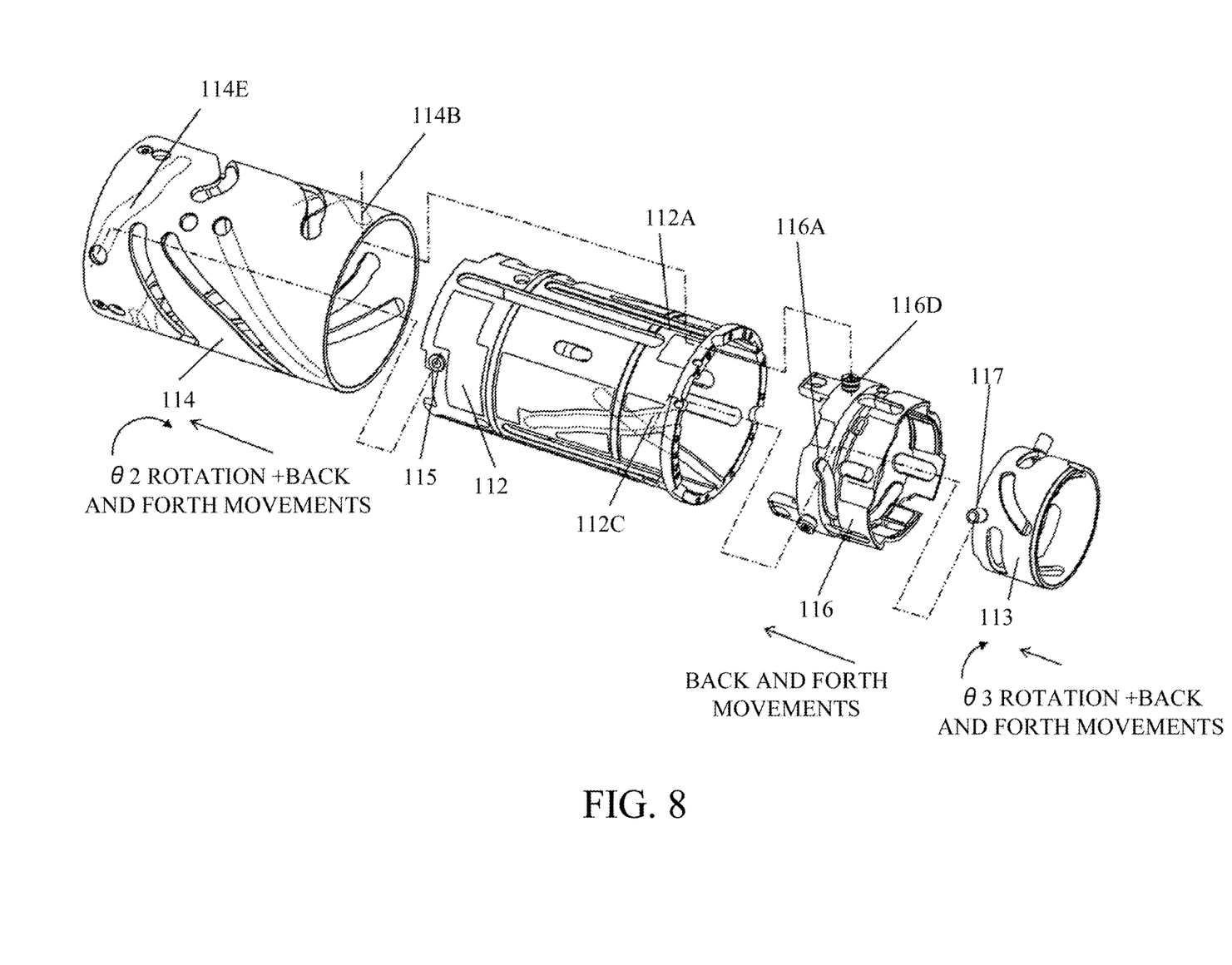
FIG. 8 is an exploded perspective view of a second rotation angle conversion mechanism according to this embodiment.

Referring now to FIG. 8, a detailed description will be given of the second rotation angle conversion mechanism (second rotation angle converter). FIG. 8 is an exploded perspective view of the second rotation angle conversion mechanism. The second rotation angle conversion mechanism is a mechanism for rotating the sub cam barrel 113 by a third rotation angle θ3 (θ2>θ3) by rotating the cam barrel 114 by the second rotation angle θ2.

In this embodiment, the second rotation angle conversion mechanism includes the cam barrel 114, the guide barrel 112, the cam follower 115 fixed to the guide barrel 112, the third unit base barrel 116, the sub cam barrel 113, and the cam follower 117 fixed onto the sub cam barrel 113. The guide barrel 112 has the first linear movement guide groove 112A and the cam groove 112C. The cam barrel 114 has the cam barrel moving cam groove 114E and the third unit driving cam groove 114B. The cam follower 116D is fixed onto the third unit base barrel 116, and the cam groove 116A is formed.

A detailed description will be given of the operation of the second rotation angle conversion mechanism in the movement from the wide-angle side to the telephoto side. As the zoom operation ring 118 viewed from the camera body 200 side rotates counterclockwise, the cam barrel 114 is rotated and moved back and forth in the optical axis direction by the first rotation angle conversion mechanism. The moving amount then is expressed by the term (2).

The third unit base barrel 116 is held by the first linear movement guide groove 12A and the third unit driving cam groove 114B and the cam follower 116D, and thus is linearly advanced in the optical axis direction along with the rotation and back and forth movements of the cam barrel 114. A moving amount of the third unit base barrel 116 relative to the cam barrel 114 is expressed by the following term (6) in the optical axis direction where α4 is an angle between the optical axis orthogonal direction and the third unit driving cam groove 114B:

$$\Delta\theta 2 \times r4 \times \tan \alpha 4 \quad (6)$$

In the term (6), r4 is a distance between the optical axis and the third unit driving cam groove 114B.

The third unit base barrel 116 and the sub cam barrel 113 are restricted by unillustrated fitting diameters between the third unit base barrel 116 and the sub cam barrel 113 in the optical axis in-plane direction. When the cam follower 115 is engaged with the cam groove 116A, the position in the optical axis direction is determined. The cam follower 115 is also engaged with the cam groove 112C in the guide barrel 112, and as the third unit base barrel 116 linearly moves relative to the guide barrel 112, the sub cam barrel 113 rotates by a minute rotational angle Δθ3 around the optical axis. A moving amount of the sub cam barrel 113 in the optical axis direction relative the third unit base barrel 116 is expressed as follows, where $\alpha 5$ is an angle between the sub cam barrel 113 and the direction perpendicular to the optical axis of the cam groove 116A:

$$-\Delta\theta 3 \times r5 \times \tan \alpha 5 \qquad (7)$$

In the term (7), r5 is a distance between the cam groove 116A and the optical axis.

From the above calculation, a moving amount of the sub cam barrel 113 relative to the guide barrel 112 is expressed by the terms (2)+(6)+(7). The cam follower 117 is rotated around the optical axis by the minute rotational angle $\Delta\theta 3$ by the cam groove 112C. The cam follower 117 moves in the optical axis direction as follows, where $\alpha 6$ is an angle between the cam groove 112C and the direction orthogonal to the optical axis:

$$\Delta\theta 3 \times r6 \times \tan \alpha 6 \qquad (8)$$

In the term (8), r6 is a distance between the cam groove 112C and the optical axis.

Since the cam follower 117 is fixed onto the sub cam barrel 113, its moving amount in the optical axis direction is the same as that of the sub cam barrel 113. The moving amount of the cam follower 117 is expressed by the terms (2)+(6)+(7)=the term (8), and the following expression (9) is derived which expresses a relationship between the minute rotational angle $\Delta\theta 2$ and the minute rotational angle $\Delta\theta 3$:

$$\Delta\theta 3 = \Delta\theta 2 \times ((r2 \times \tan(-\alpha 2) + r4 \times \tan \alpha 4)/(r5 \times \tan \alpha 5 + r6 \times \tan \alpha 6) \qquad (9)$$

The second rotation angle conversion mechanism converts the rotation angle as expressed by the expression (9). The sub cam barrel 113 has a plurality of cam grooves (first sub cam grooves 113A and second sub cam grooves 113B) for moving at least two of the plurality of lens holders in the optical axis direction at mutually different positions in the optical axis direction. The arrangement of the cam grooves can be realized by making the rotation angle (third rotation angle $\theta 3$) of the sub cam barrel 113 as small as 40°.

The interchangeable lens 100 according to this embodiment is configured so as to satisfy a relationship of $\theta 1 > \theta 2 > \theta 3$ among the first rotation angle $\theta 1$, the second rotation angle $\theta 2$, and the third rotation angle $\theta 3$. This configuration can increase the first rotation angle $\theta 1$ of the zoom operation ring 118 and reduce the third rotation angle $\theta 3$ of the sub-cam barrel 113 having the plurality of cam grooves (the first sub cam groove 113A and the second sub cam groove 113B) in the optical axis direction. In addition, this configuration can provide the guide barrel (fixed frame) 112 with the cam groove 112 in an angle in which the plurality of linear movement grooves (the first linear movement guide groove 112A and the second linear movement guide groove 112B) do not exist, by reducing the third rotation angle $\theta 3$. Therefore, the interchangeable lens 100 can be made smaller.

According to this embodiment, the first cam barrel has only one type of cam groove as a groove for driving the optical element (lens), and thus can make the rotation angle wider. The first cam barrel may have one type of linear movement groove. The second cam barrel has at least two types of cam grooves for driving the plurality of units. The third cam barrel has plural types of cam grooves or linear movement grooves at different positions in the optical axis direction, and can drive or hold a plurality of units in a small space.

At least five types of cam grooves or linear movement grooves are arranged on a section C (plane orthogonal to the optical axis) in the direction orthogonal to the optical axis where the zoom state of the interchangeable lens 100 is the telephoto side, as illustrated in FIG. 2. In other words, this embodiment provides at least five types of cam grooves on the plane orthogonal to the optical axis O while changing the zoom position of the interchangeable lens 100 from the wide-angle end to the telephoto end. This configuration can arrange many elements within a limited space and achieves the space saving scheme. This embodiment can arrange six types of cam grooves or linear movement grooves on the section C. More specifically, the cam grooves or the linear movement grooves include the zoom cam grooves 118A, the rotation transmitting cam groove 114A, the second linear movement guide grooves 112B, the first linear movement guide grooves 112A, the cam groove 112C, and the third unit driving cam groove 114B, which serve as the first and second rotation angle conversion mechanisms.

Where the zoom state is the telephoto side, this embodiment can arrange the zoom cam groove 118A, the third unit driving cam groove 114B, the cam groove 116A, the first sub cam groove 113A, and the second sub cam groove 113B on the section C in the direction orthogonal to the optical axis. This configuration can with a small space not only enlarges the rotation angle of the zoom operation ring (zoom ring) 118 but also disposes a cam groove for individually moving the totally four units at the same positions in the optical axis direction.

The lens apparatus (interchangeable lens 100) in this embodiment includes a plurality of lens holders (the first lens holder 101 to the sixth lens holder 107), a first cam barrel (the zoom operation ring), a second cam barrel (the cam barrel 114), and a third cam barrel (the sub cam barrel 113). The first, second, and third cam barrels have cam grooves for moving at least one of the plurality of lens holders in the optical axis direction. The first cam barrel is located outside the second cam barrel and the third cam barrel, and the second cam barrel is located outside the third cam barrel. This embodiment arranges the first, second, and third cam barrels in order from the outer diameter side to the inner diameter side (the optical axis O side). Hence, even with the same angle, the circumference length is longer as the diameter becomes longer. When the first cam barrel is rotated around the optical axis by the first rotation angle $\theta 1$, the second cam barrel is rotated by the second rotational angle $\theta 2$ and the third cam barrel is rotated by the third rotation angle $\theta 3$, and the lens apparatus satisfies the relationship $\theta 1 > \theta 2 > \theta 3$ among the first rotation angle $\theta 1$, the second rotation angle $\theta 2$, and the third rotation angle $\theta 3$. This embodiment can make smaller the rotation angle of the third cam barrel having the smallest diameter and improve the strength when the necessary cam groove width and the thickness between the grooves other than a rotating amount of the cam groove center of each cam barrel are considered.

This embodiment can provide a lens apparatus and an imaging apparatus, each of which has a plurality of lens holders and a large rotation angle of the operation ring.

The first and second rotation angle conversion mechanisms according to this embodiment have a high design freedom, but the present invention is not limited to this example. For example, setting $\alpha 2 = \alpha 5 = 0°$ can make simpler the configuration. While this embodiment discusses the interchangeable lens used for a single-lens reflex film camera, the present invention is applicable to lens apparatuses for various imaging apparatuses (optical apparatuses), such as a lens shutter camera, a digital camera, and a video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-227710, filed on Nov. 28, 2017, which is hereby incorporated by reference herein in its entirety.

What is claimed is:

1. A lens apparatus comprising:
a plurality of lens holders;
a first cam barrel, a second cam barrel, and a third cam barrel each having a cam groove configured to move at least one of the plurality of lens holders in an optical axis direction;
a first rotation angle converter including a first linear movement barrel, and configured to rotate the second cam barrel by a second rotation angle $\theta 2$ as the first cam barrel rotates by a first rotation angle $\theta 1$, convert a rotational movement of the first cam barrel into a linear movement of the first linear movement barrel, and convert the linear movement of the first linear barrel into a rotational movement of the second cam barrel; and
a second rotation angle converter including a second linear movement barrel, and configured to rotate the third cam barrel by a third rotation angle $\theta 3$ as the second cam barrel rotates by a second rotation angle $\theta 2$, convert a rotational movement of the second cam barrel into a linear movement of the second linear movement barrel, and convert the linear movement of the second linear movement barrel into a rotational movement of the third cam barrel,
wherein the first cam barrel is located outside the second cam barrel and the third cam barrel, and the second cam barrel is located outside the third cam barrel, and
wherein when the first cam barrel is rotated by the first rotation angle $\theta 1$ around an optical axis, the second cam barrel rotates by the second rotation angle $\theta 2$, the third cam barrel rotates by the third rotation angle $\theta 3$, and the following expression is satisfied:
$\theta 1 > \theta 2 > \theta 3$.

2. The lens apparatus according to claim 1, further comprising a fixed frame provided inside the first cam barrel,
wherein the fixed frame includes a plurality of guide grooves configured to linearly move each of the first linear movement barrel and the second linear movement barrel.

3. The lens apparatus according to claim 2, wherein the fixed frame includes a cam groove configured to rotate the third cam barrel.

4. The lens apparatus according to claim 3, wherein the plurality of guide grooves in the fixed frame and the cam groove in the fixed frame are formed at different positions around the optical axis.

5. The lens apparatus according to claim 1, wherein the first cam barrel includes a cam groove configured to linearly move the first linear movement barrel in an optical axis direction.

6. The lens apparatus according to claim 1, wherein the second cam barrel includes a cam groove configured to convert the linear movement of the first into a rotational movement and a cam groove configured to move the second linear movement barrel.

7. The lens apparatus according to claim 1, wherein the third cam barrel includes a plurality of cam grooves configured to move at least two of the plurality of lens holders in the optical axis direction at positions that overlap each other in the optical axis direction.

8. The lens apparatus according to claim 1, further comprising at least five types of cam grooves on a plane orthogonal to an optical axis while a zoom position of the lens apparatus is changed from a wide-angle end to a telephoto end.

9. The lens apparatus according to claim 8, further comprising at least six types of cam grooves on a plane orthogonal to an optical axis while the zoom position of the lens apparatus is changed from the wide-angle end to the telephoto end.

10. An imaging apparatus comprising:
a lens apparatus; and
a camera body configured to hold an image sensor that photoelectrically converts an optical image formed via the lens apparatus,
wherein a lens apparatus includes:
a plurality of lens holders;
a first cam barrel, a second cam barrel, and a third cam barrel each having a cam groove used to move at least one of the plurality of lens holders in an optical axis direction;
a first rotation angle converter including a first linear movement barrel, and configured to rotate the second cam barrel by a second rotation angle $\theta 2$ as the first cam barrel rotates by a first rotation angle $\theta 1$, convert a rotational movement of the first cam barrel into a linear movement of the first linear movement barrel, and convert the linear movement of the first linear barrel into a rotational movement of the second cam barrel; and
a second rotation angle converter including a second linear movement barrel, and configured to rotate the third cam barrel by a third rotation angle $\theta 3$ as the second cam barrel rotates by a second rotation angle $\theta 2$, convert a rotational movement of the second cam barrel into a linear movement of the second linear movement barrel, and convert the linear movement of the second linear movement barrel into a rotational movement of the third cam barrel,
wherein the first cam barrel is located outside the second cam barrel and the third cam barrel, and the second cam barrel is located outside the third cam barrel, and
wherein when the first cam barrel is rotated by the first rotation angle $\theta 1$ around an optical axis, the second cam barrel rotates by the second rotation angle $\theta 2$, the third cam barrel rotates by the third rotation angle $\theta 3$, and the following expression is satisfied:
$\theta 1 > \theta 2 > \theta 3$.

* * * * *